United States Patent
Bramley

[11] Patent Number: 5,811,056
[45] Date of Patent: Sep. 22, 1998

[54] COOLING SYSTEM FOR PRESS HEAD

[76] Inventor: Alan Bramley, Harrimans Lane, Dunkirk, Nottingham, NG 7 2SD, United Kingdom

[21] Appl. No.: 860,207
[22] PCT Filed: Apr. 12, 1996
[86] PCT No.: PCT/GB96/00887
§ 371 Date: Jun. 27, 1997
§ 102(e) Date: Jun. 27, 1997
[87] PCT Pub. No.: WO96/32513
PCT Pub. Date: Oct. 17, 1996

[30] Foreign Application Priority Data

Sep. 14, 1995 [GB] United Kingdom .................. 9518794
Apr. 12, 1998 [GB] United Kingdom .................. 9507605

[51] Int. Cl.$^6$ .............................. C22B 21/00; C22B 7/04
[52] U.S. Cl. ........................................... 266/205; 266/227
[58] Field of Search ..................................... 266/205, 227; 75/585, 672

[56] References Cited

U.S. PATENT DOCUMENTS

| | | |
|---|---|---|
| 4,057,232 | 11/1977 | Ross et al. ............................ 266/227 |
| 4,386,956 | 6/1983 | Roth et al. ............................. 75/672 |
| 4,527,779 | 7/1985 | Roth et al. ............................ 266/227 |
| 4,540,163 | 9/1985 | Van Linden et al. ................... 266/201 |
| 4,565,572 | 1/1986 | Van Linden et al. .................... 75/672 |
| 4,772,320 | 9/1988 | Van Linden et al. .................... 75/672 |
| 5,397,104 | 3/1995 | Roth ..................................... 266/227 |
| 5,669,957 | 9/1997 | Roth ..................................... 266/227 |

Primary Examiner—Scott Kastler
Attorney, Agent, or Firm—Reese Taylor

[57] ABSTRACT

A cooling system for an aluminum dross press head includes an air inlet means allowing air to be drawn into the press head and a hollow actuating rod connected to the press head which extracts air from the press head.

13 Claims, 5 Drawing Sheets

_5,811,056_

COOLING SYSTEM FOR PRESS HEAD

FIELD OF THE INVENTION

The present invention relates to a cooling system for a press head and more particularly to a cooling system for an aluminium dross press.

BACKGROUND OF THE INVENTION

In any aluminium furnace system a substantial amount of dross is produced and this dross can contain a large amount of pure aluminium which is trapped in the dross. This aluminium can be released by mechanical action on the dross.

A system for mechanically pressing dross comprises a press head which is raised and lowered and acts on dross contained in a skim box the aluminium thus released being drained through a hole in the floor of the skim box into a press sow mould.

The press head generally comprises a semispherical shape which has a plurality of ridges thereon to increase pressure on the dross as the head is raised and lowered onto the dross.

The press head is obviously heated to the high temperature of the aluminium dross which has preferably been transferred into the skim box directly from the furnace. It is advantageous to be able to cool the head in order to quickly cool the dross and to reduce thermal stress on the head.

An obvious method of cooling is to use water to cool the head but this can be extremely dangerous since if the head cracks cold water will pour onto the hot dross possibly causing an explosion resulting in flying hot aluminium. This is obviously unacceptable.

The use of water also presents problems in any system which allows rotation of the press head, since the water pipe connections need to be flexibly connected to the head. Even then for normal pipe connection the head can not continuously rotated but must reciprocate rotating in a first direction and then backwards back to its starting position.

SUMMARY OF THE INVENTION

It is an object of the present invention to provide a press head system which can be cooled by passage of air and which can rotate continuously in a stepped manner in a preferred direction.

By continuous rotation it is not meant that the head is always rotating but that it continues to rotate in a stepped or in remental manner in the same direction.

The present invention therefore provides a press head system for pressing aluminium dross the press head bang provided with means for movement in a vertical direction to press dross contained in a skim box situated beneath the head in which the means for movement of the press head comprises hydraulic ram means, said ram means being operative to raise and lower the press head and including means for the passage of cooling air through said press head said means comprising a plurality of air inlet holes proximate to the periphery of the press head.

Preferably said ram means is operative to raise and lower the press head by means of a double acting hydraulic cylinder and an actuating rod, in which the actuating rod is hollow and is connected to the press head to allow cooling air to pass through the hollow rod and the press head.

Preferably the operating rod is elongate and protrudes from both ends of the double acting hydraulic cylinder at the bottom end being connected to the press head and at the top end being enclosed in a chamber sized to allow movement of the actuating rod within the chamber.

Preferably the chamber includes an air outlet connected to an air blower which pulls air out of the chamber and through the hollow actuating rod.

Preferably the press head is provided with a plurality of air inlet holes proximate to its periphery each hole being provided with a guard mesh to allow only cooling air to pass into the head.

Preferably the head is provided with an elongate sleeve which protrudes downwardly from the operating rod and which is operable to force the cooling air to pass close to the inner surface of the press head.

BRIEF DESCRIPTION OF THE DRAWINGS

Embodiments of the present invention will now be described with reference to the accompanying drawings in which.

BRIEF DESCRIPTION OF THE PREFERRED EMBODIMENTS

With reference now to the drawings the dross pressing apparatus will include in practice many electrical electronic and hydraulic control systems. These relate to the cyclical movements of the press head in a vertical direction as indicated by arrow V. Hydraulic drives and electronic control systems for such drives are known in machinery control systems and these will not be described in detail in this application which is directed to the cooling system for the head.

Figure 1:
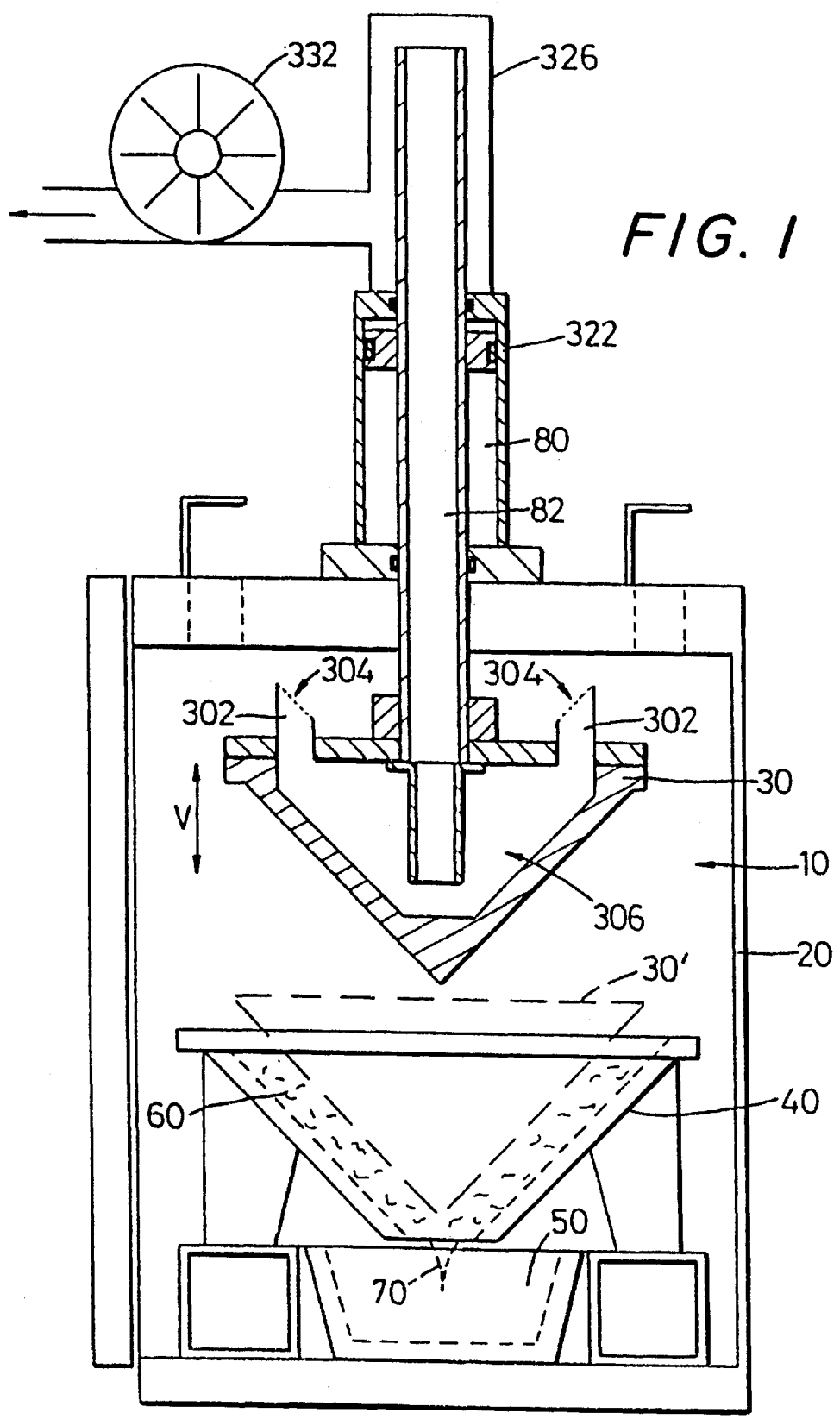
FIG. 1 shows schematically in front elevation a press for aluminium dross.

With reference to FIG. 1 the press system comprises a press 10 mounted for safety in a cabinet 20 (not shown in full detail) which for safety and environmental reasons substantially completely encloses the press 10 when it is being operated.

The press 10 comprises, a press head 30, a skim box 40 and a press sow mould 50.

Aluminium dross 60 is loaded into box 40 with head 30 at its highest position 30 (dotted), lowest position 30' being shown dotted. The operation comprises cyclically raising and lowering head 30 onto the dross 60 to crush the dross and to release the aluminium 70 which drips from the skim box 40 into the mould 50 forming an ingot which can be later removed in a known manner.

Figure 6:
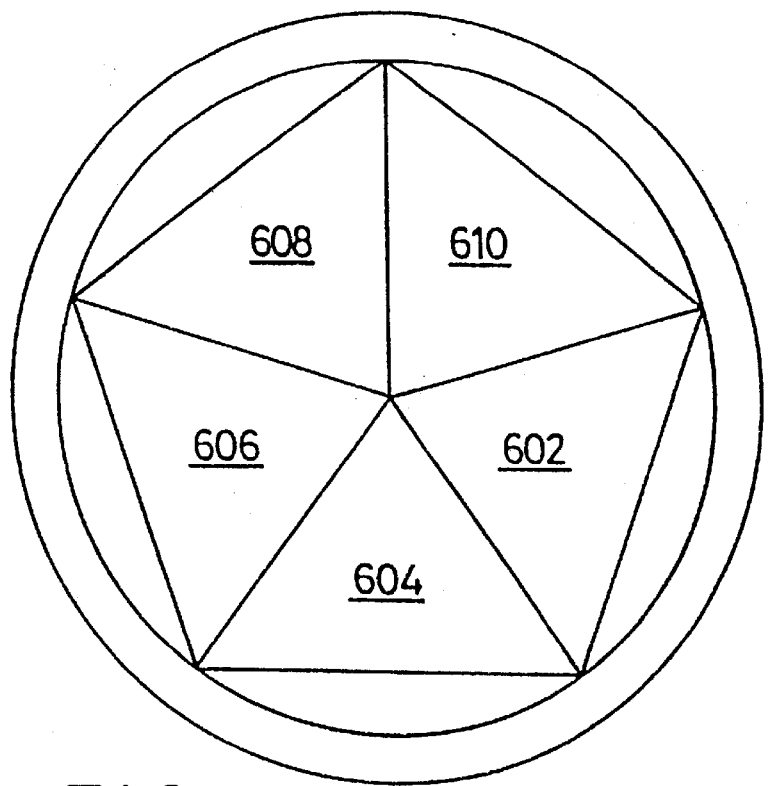
FIGS. 6 and 7 show one possible design of head in plan and elevation respectively.
Figure 7:
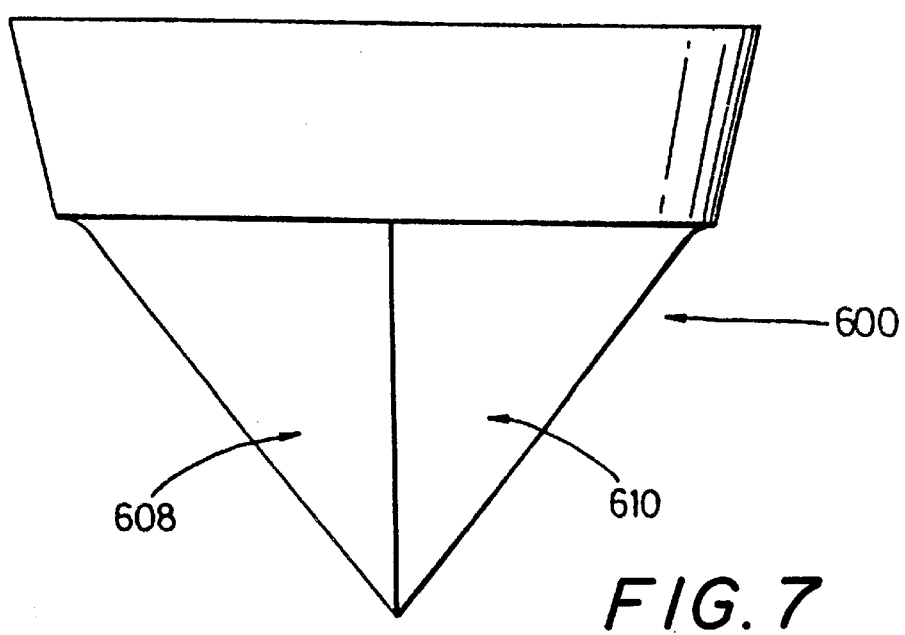

The press head 30 is in operation cyclically moved up and down in the direction indicated by arrow V by means of a hydraulic cylinder 80 and actuating rod 82. The head 30 may be of the shape shown in FIGS. 6 and 7 and may comprise a generally inverted pyramid 600 with five faces 602–610 which increase the pressure on the aluminium dross at predetermined positions.

The head 30 is normally a cast structure and is subjected to heat stress caused by repeatedly pressing the hot dross (at approximately 800° C.) and then being cooled when either not in contact with the dross or when the press is not in use. In this latter case the head 30 will cool to ambient (approximately 25° C.) and will receive a large thermal shock when commencing pressing of the dross.

It is obviously advantageous to cool the head 30 and in known systems it has been proposed to use water supplied to the head via hoses (not shown). This however is possibly very dangerous and secondly does not allow the head to be rotated. Rotation of the head is advantageous and is described in copending application filed on the same date as the present application.

Figure 2:
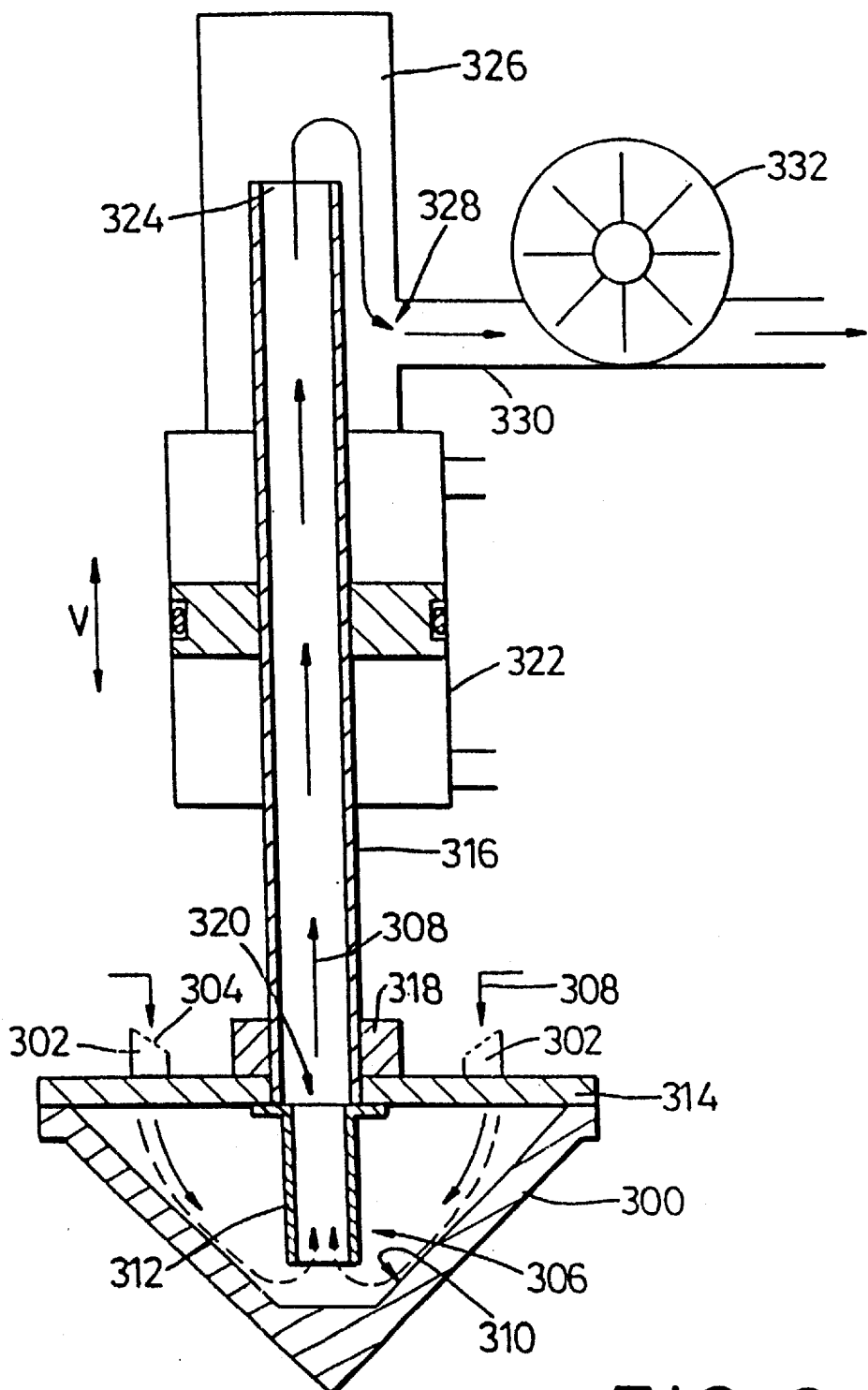
FIG. 2 shows schematically in front elevational cross section a press system incorporating a cooling system for the press head in accordance with the present invention.

With reference to FIG. 2 a press head system according to the present invention is shown.

The modified press head 300 is hollow (as in 30 in FIG. 1) but is provided with air inlets 302 each having a grill 304 which prevents large particles from entering into the hollow space 306 inside the head 300. Air indicated by arrows 308 flow through grills 302 into space 306. This air is guided close to the inner surface 310 of head 300 by a sleeve or guide tube 312 which extends downwards from a support plate 314. The actuating rod 316 is hollow and is also connected to the support plate 314 by for example a support collar 318. The plate 314 is provided with an aperture 320 thereby forming an air passage from the head 300 into the hollow stem of the actuating rod 316.

The rod 318 is moved cyclically in the direction of arrow V by means of a double acting hydraulic cylinder 322. The rod 316 passes through cylinder 322 and the top end 324 of rod 316 is enclosed in a box or compartment 326 which forms an air tight compartment with hydraulic cylinder 322. Compartment 326 is provided with an air outlet 328 which is connected via a duct 330 to a blower 332.

Figure 3:
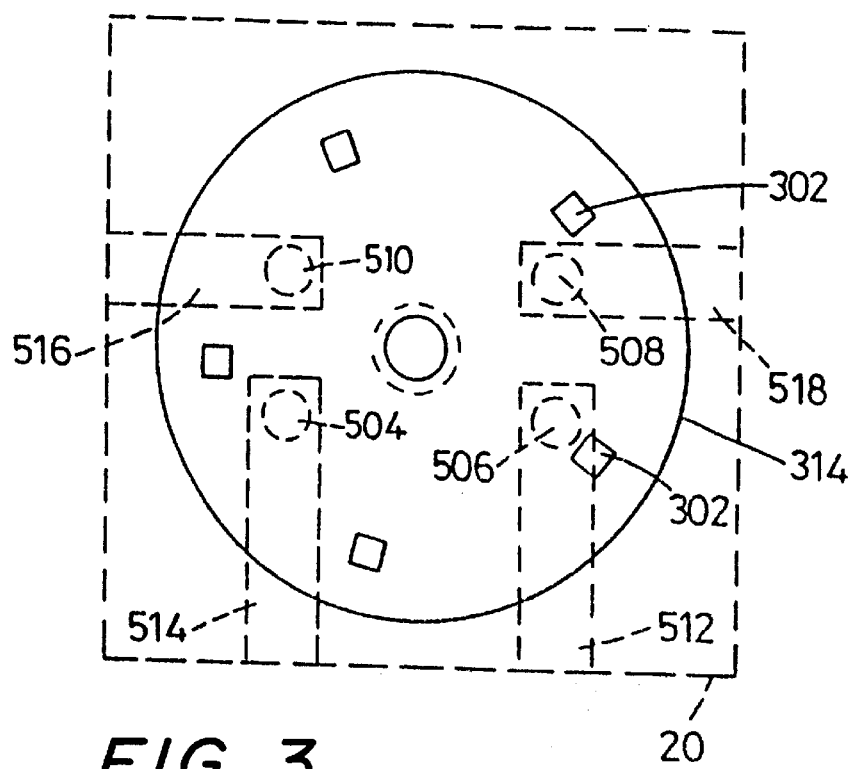
FIG. 3 shows in plan view the press head of FIG. 2.

Air is drawn via inlets 302 via press head, actuating rod 316, compartment 326 and to blower 332. As shown in FIG. 3 there may be a plurality of air inlets situated close to the periphery of the press head 300 which will ensure passage of the cooling air over the whole of the inner surface.

The arrangement thereby allows the press head 300 to be cooled also to be rotated.

Figure 4:
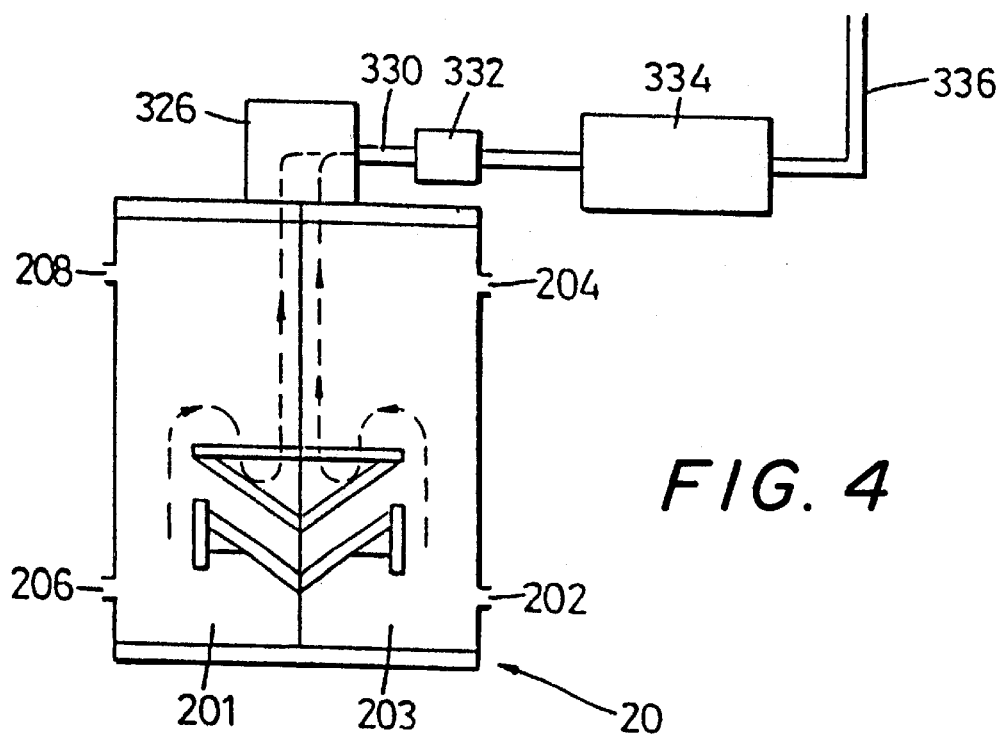
FIG. 4 shows schematically a fume purification system for the press of FIGS. 1 to 3.

The cooling head arrangement of FIGS. 1 to 3 has a further advantage as illustrated with reference to FIG. 4.

When hot dross is pressed fumes are generated which are released all the time but especially when the head is raised.

By substantially sealing the cabinet 20 using for example hydraulically operated doors 201, 203 and leaving only small air inlet grilles 202, 204, 206, 208 fumes are contained within the cabinet since the air extraction system 324, 326, 328 pulls air from within the cabinet 20. This air carries with it the fumes from the dross and these fumes are in this embodiment pulled by fan 332 into a fume-purification plant 334 and then once cleaned are exhausted to atmosphere via chimney 336.

Alternatively, the exhaust 330 can be fed directly to an existing fume purification plant used for the aluminium furnace from which the dross is obtained.

Figure 5:
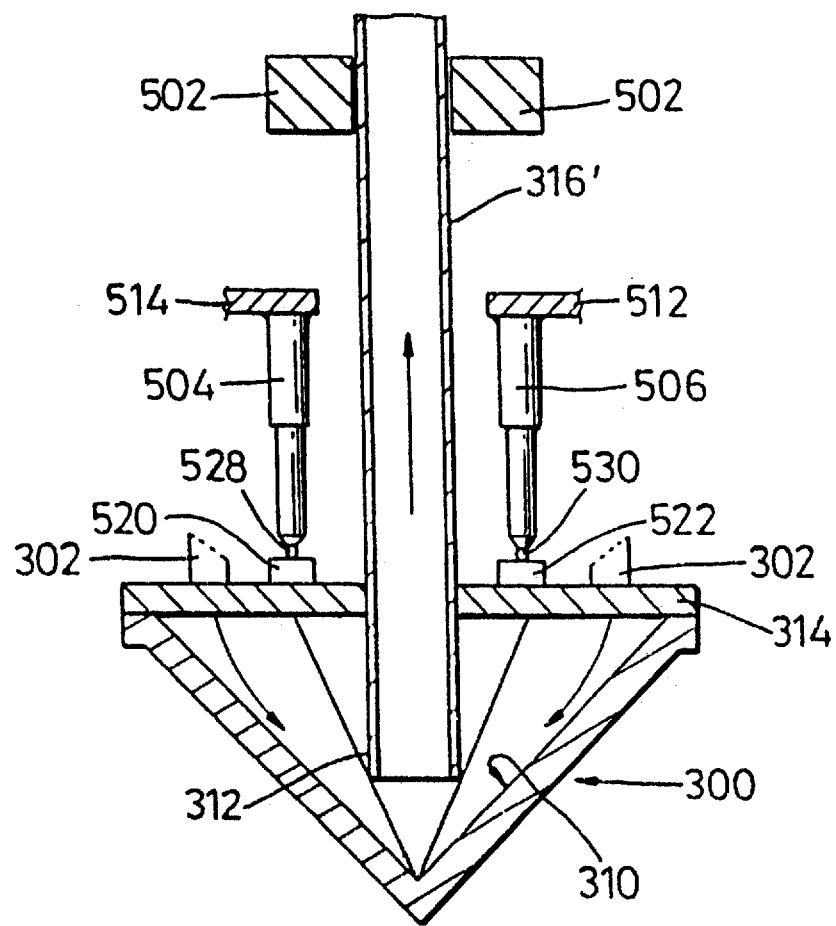
FIG. 5 shows schematically a modified press head including a plurality of hydraulic rams.

An alternative embodiment is shown in FIG. 5 in which the reference numerals in FIG. 2 are used to identify parts which perform the same or similar functions.

In FIG. 5 the air cooling system is as shown in FIG. 2 except that the actuating rod 316 is replaced by a simple tube 316' which may either be a rigid tube passing through a seal 502 or could be a flexible pipe arrangement.

This is enabled because in this embodiment the hydraulic ram pressure is provided by four smaller hydraulic rams 504, 506, 508 and 510 which are fixed to suitable supports 512, 514, 516 and 518 on the cabinet 20. In FIG. 5 only two rams 504, 506 and other supports 516, 518 being indicated in FIG. 3 by dotted outline.

The opposite ends of rains 504, 506, 508, 510 are attached to suitable blocks 520, 522, 524, 526 on the upper surface of support plate 314 (524, 526 not shown).

The attachment to the blocks is by respective pivot means 528, 530, 532, 534 which allow a limited amount of tilting of plate 314 during operation.

During operation all four hydraulic rams 504–510 are operated using a pressure equalisation system such that all four rams are raised and lowered in synchronism.

The pivots 528–534 allow a small amount of differential movement between rams and thereby prevent plate 314 from undue stress during pressing operations.

The advantage of using four rams is that they can individually be much smaller than the single large ram. They can therefore be selected from standard ram sizes rather than having to be specifically designed as in FIG. 2.

Additionally with the use of four rams a larger head size can be used, the rams being uprated in proportion to the head size.

Although four hydraulic rams are shown it is possible to use a different number such as, for example, three which would be arranged in an equilateral triangle formation. If the head shape was not circular but elongate then possibly two rams could be used, positioned at each end of the head to provide a spread of pressure.

I claim:

1. A press head for pressing aluminum dross, the press head being provided with means for movement in a vertical direction to press dross contained in a skim box situated beneath the head in which the means for movement of the press head comprises hydraulic ram means, said ram means being operative to raise and lower the press head and characterized in that the press head includes means for the passage of cooling air through said press head, said means comprising a plurality of air inlet holes proximate to the periphery of the press head, said air inlet holes being connected to a source of cooling air.

2. A press head as claimed in claim 1 characterized in that said ram means is operative to raise and lower the press head by means of a double acting hydraulic cylinder and an actuating rod, in which the actuating rod is hollow and is connected to the press head to allow cooling air to pass through the hollow rod and the press head.

3. A press head for pressing aluminum as claimed in claim 2 characterized in that the operating rod is elongate and protrudes from both ends of the double acting hydraulic cylinder, at the bottom end being connected to the press head and at the top end being enclosed in a chamber sized to allow movement of the actuating rod within the chamber.

4. A press head as claimed in claim 3 characterized in that the chamber includes an air outlet connected to an air blower which pulls air out of the chamber and through the hollow actuating rod.

5. A press head as claimed in claim 4 characterized in that each air inlet hole is provided with a guard mesh to allow only cooling air to pass into the head.

6. A press head as claimed in claim 5 characterized in that the head is provided with an elongate sleeve which protrudes downwardly from the operating rod and which is operable to force the cooling air to pass close to the inner surface of the press head.

7. A press head for pressing aluminum dross as claimed in claim 1 characterized in that it includes a substantially airtight container surrounding the press head such that the cooling air is obtained from within the container and including a fume purification system connected to collect the cooling air and to thereby purify any fumes present within said container.

8. A press head as claimed in claim 1 characterized in that the hydraulic ram means comprises a plurality of hydraulic rams connected in a regular pattern to an upper surface of the press head and being a operative synchronously to effect movement of the press head.

9. A press head as claimed in claim 8 characterized in that each hydraulic ram is connected to the upper surface by pivot means to allow slight differential movement of the press head.

10. A press head for pressing aluminum dross, the press head being provided with means for movement in a vertical direction to press dross contained in a skim box situated beneath the head in which the means for movement of the press head comprises hydraulic ram means, said ram means being operative to raise and lower the press head and characterized in that the press head includes means for the passage of cooling air through the press bead, said means comprising a plurality of air inlet holes proximate to the periphery of the press head, in which said ram means is operative to raise and lower the press head by means of a double acting hydraulic cylinder and an actuating rod, in which the actuating rod is hollow and is connected to the press head to allow cooling air to pass through the hollow rod and the press head, in which the operating rod is elongate and protrudes from both ends of said double acting hydraulic cylinder, at the bottom end being connected to the press head and at the top end being enclosed in a chamber sized to allow movement of the actuating rod within the chamber and in which the chamber includes an air outlet connected to an air blower which pulls air out of the chamber and through the hollow actuating rod.

11. A press head as claimed in claim 10 in which each air inlet hole is provided with a guard mesh to allow only cooling air to pass into the head.

12. A press head as claimed in claim 11 characterized in that the head is provided with an elongate sleeve which protrudes downwardly from the operating rod and which is operable to force the cooling air to pass close to the inner surface of the press head.

13. A press head for pressing aluminum dross as claimed in claim 10 characterized in that it includes a substantially airtight container surrounding the press head such that the cooling air is obtained from within the container and including a fume purification system connected to collect the cooling air and to thereby purify any fumes present within said container.

* * * * *